United States Patent [19]

Okamoto

[11] Patent Number: 5,257,392
[45] Date of Patent: Oct. 26, 1993

[54] SYSTEM FOR LOADING AND DUMPING DATA IN A DATA FLOW PROCESSOR BASED ON PAIRED PROGRAM DATA AND DATA TO BE PROCESSED

[75] Inventor: Toshiya Okamoto, Kyoto, Japan

[73] Assignee: Sharp Kabushiki Kaisha, Osaka, Japan

[21] Appl. No.: 807,735

[22] Filed: Dec. 16, 1991

Related U.S. Application Data

[63] Continuation of Ser. No. 302,454, Jan. 27, 1989, abandoned.

[30] Foreign Application Priority Data

Jan. 29, 1988 [JP] Japan ................... 63-20187

[51] Int. Cl.$^5$ ................ G06F 9/00; G06F 9/30; G06F 9/445
[52] U.S. Cl. ................ 395/800; 364/232.22; 364/243.42; 364/243.43; 364/259.2; 364/260.4; 364/261.3; 364/DIG. 1
[58] Field of Search ................... 395/800

[56] References Cited

U.S. PATENT DOCUMENTS

| | | | |
|---|---|---|---|
| 4,042,972 | 8/1977 | Gruner et al. | 364/200 |
| 4,084,224 | 4/1978 | Appell et al. | 364/200 |
| 4,084,225 | 4/1978 | Anderson et al. | 364/200 |
| 4,084,226 | 4/1978 | Anderson et al. | 364/200 |
| 4,084,227 | 4/1978 | Anderson et al. | 364/200 |
| 4,084,228 | 4/1978 | Duford et al. | 364/200 |
| 4,096,568 | 6/1978 | Bennett et al. | 364/200 |
| 4,153,932 | 5/1979 | Dennis et al. | 364/200 |
| 4,225,921 | 9/1980 | Hartley et al. | 364/200 |
| 4,571,672 | 2/1986 | Hatada et al. | 364/200 |
| 4,642,755 | 2/1987 | Hinch | 364/200 |
| 4,809,159 | 2/1989 | Sowa | 364/200 |
| 4,814,978 | 3/1989 | Dennis | 364/200 |
| 4,837,676 | 6/1989 | Rosman | 364/200 |
| 4,841,436 | 6/1989 | Asano et al. | 364/200 |
| 4,860,191 | 8/1989 | Nomura et al. | 364/200 |
| 4,953,083 | 8/1990 | Takata et al. | 364/200 |
| 5,036,456 | 7/1991 | Koegel | 364/200 |
| 5,072,377 | 12/1991 | Asai et al. | 395/400 |
| 5,117,499 | 5/1992 | Miyata | 395/800 |
| 5,155,820 | 10/1992 | Gibson | 395/375 |

OTHER PUBLICATIONS

T. Okamoto et al "Quantitative Evaluation of Data Flow-Rate in a Data-Driven Processor" Proceedings of the 34th National Conference of Japanese Society of Information Processing Engineers of Japan, Mar. 1987, pp. 237-238.

*Primary Examiner*—Thomas C. Lee
*Assistant Examiner*—Peter Y. Wang

[57] ABSTRACT

A system of loading and dumping data in an information processor includes a program control portion, a paired data detecting portion and an operation processing portion. An execution packet applied to the program control portion has a destination information field showing the destination of the execution packet, an identifier field for identifying data having the queue address of the paired data detecting portion, and an address information field for identifying paired data, together with the identifier, in the paired data detecting portion and for informing the program control portion of the next instruction to be fetched. The identifier field is used as a part of an address for sending data and a number for identifying the information processor. The number is contained in a part of the queue address so that a structure of the packet is converted and the packet after conversion is used for loading and dumping data.

1 Claim, 3 Drawing Sheets

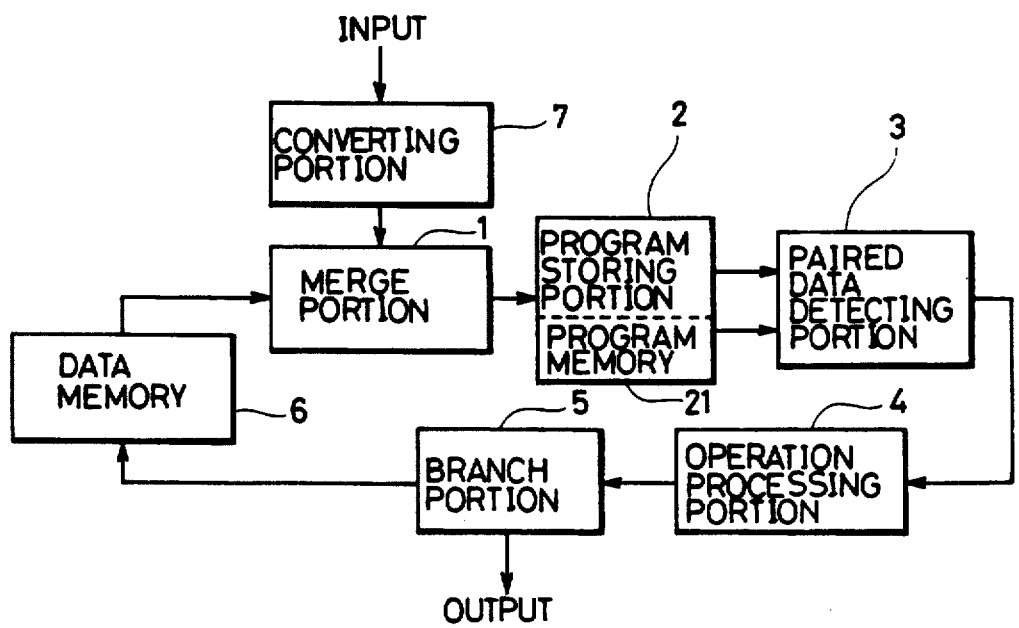

FIG.3A

| h | 00 | 1100 | HIGH ORDER OF ADDRESS | 000010 | PROCESSOR NUMBER | LOW ORDER OF ADDRESS |

FIG.3B

| t | | LOAD DATA | |

FIG.4

| h | 00 | 1100 | HIGH ORDER OF ADDRESS | 000001 | PROCESSOR NUMBER | LOW ORDER OF ADDRESS |

FIG.5A

| h | 00 | 1010 | HIGH ORDER OF ADDRESS | NOP | NUMBER OF DESTINATION | LOW ORDER OF ADDRESS |

FIG.5B

| t | | DUMPED DATA | |

FIG.6

| h | 01 | 1101 | HIGH ORDER OF ADDRESS | 000100 | PROCESSOR NUMBER | LOW ORDER OF ADDRESS |

FIG.7A

| h | 00 | 1011 | HIGH ORDER OF ADDRESS | NOP | PROCESSOR NUMBER | LOW ORDER OF ADDRESS |

FIG.7B

| t | DUMPED DATA |

SYSTEM FOR LOADING AND DUMPING DATA IN A DATA FLOW PROCESSOR BASED ON PAIRED PROGRAM DATA AND DATA TO BE PROCESSED

This application is a continuation of application Ser. No. 07/302,454 filed on Jan. 27, 1989, now abandoned.

BACKGROUND OF THE INVENTION

1. Field of the Invention

The present invention relates generally to a system of loading and dumping data, and more particularly, to a data loading and dumping system of loading and dumping a data flow program into and from a program memory in a data flow type information processor in which an instruction can be executed immediately after data which are objects of an operation are collected.

2. Description of the Background Art

FIG. 8 is a schematic block diagram showing a conventional data flow type information processor, FIGS. 9A and 9B are diagrams showing a structure of a data packet inputted to the information processor shown in FIG. 8, and FIG. 10 is a diagram showing an example of program data stored in a program storing portion 2 shown in FIG. 8.

Referring now to FIGS. 8 to 10, description is made of a structure and a schematic operation of the conventional data flow type information processor. The information processor comprises a merge portion 1, a program storing portion 2, a paired data detecting portion 3, an operation processing portion 4, a branch portion 5 and a data memory 6. An inputted data packet as shown in FIGS. 9A and 9B or a data packet inputted from the data memory 6 is applied to the merge portion 1.

This inputted data packet comprises a head packet (h) and a tail packet (t). As shown in FIG. 9A, the head packet (h) comprises a field of a bit e for determining whether ordinary execution processing is performed or a program is loaded/dumped, a destination field for selecting a processing portion in which processing is to be performed, an identifier field for identifying data having the same queue address by the paired data detecting portion 3, an instruction field having instruction information stored therein, and a queue field address, together with the identifier, for identifying the destination queue in the paired data detection portion 3. As shown in FIG. 9B, the tail packet (t) comprises a flag field for identifying the result of an operation by the operation processing portion 4, a data 1 field and a data 2 field. The data 1 field or the data 2 field stores operand data.

The merge portion 1 applies either one of inputted data packets to the program storing portion 2. The program storing portion 2 comprises a program memory (not shown). The program memory stores a data flow program comprising destination information and instruction information, as shown in FIG. 10. The program storing portion 2 reads out the destination information and the instruction information from the program memory by addressing based on the destination information in the data packet, stores the information in each destination field and the instruction field in the data packet; and outputs the data packet.

The paired data detecting portion 3 queues data packets each having operand data inputted from the program storing portion 2, stores the operand data in one data packet out of the two data packets having the same destination information of a data field in the other data packet, and outputs the other data packet. On this occasion, the above described one data packet disappears. The operation processing portion 4 decodes the instruction information in the other data packet inputted from the paired data detecting portion 3, performs predetermined operation processing with respect to the two operand data included in the other data packet, stores the result of processing in the data field in the other data packet, and outputs the data packet to the branch portion 5.

The branch portion 5 outputs the data packet to the exterior or the data memory 6 based on the destination information in the data packet. The data packet outputted from the data memory 6 is applied to the merge portion 1. The merge portion 1 applies the data packet inputted from the exterior or the data packet applied from the data memory 6 to the program storing portion 2 in the order of arrival.

In the data flow type information processor shown in FIG. 8, the data packet continues to circulate through the merge portion 1, the program storing portion 2, the paired data detecting portion 3, the operation processing portion 4, the branch portion 5 and the data memory 6, so that operation processing based on the program stored in the program storing portion 2 is performed.

Meanwhile, when data is dumped/loaded from/into the program memory included in the program storing portion 2, the data packet is applied to the program storing portion 2 from the exterior through the merge portion 1. The program storing portion 2 determines whether or not a bit e for determining whether ordinary execution processing is performed or a program is loaded/dumped as shown in FIG. 9A is set in the inputted data packet. If the bit e is set, the program memory is directly accessed, whereby the data flow program is loaded and dumped into and from the program memory. If the bit e is not set, ordinary execution processing is performed. Thus, the bit e must be provided in the inputted data packet in order to determine whether the data is loaded/dumped into/from the program memory or the ordinary execution processing is performed, so that the number of bits in the inputted data packet is increased.

SUMMARY OF THE INVENTION

Therefore, an object of the present invention is to provide a system of loading and dumping data in which it can be determined without providing a bit for determining whether data is loaded/dumped or ordinary execution processing is performed whether data is loaded/dumped into/from a program memory or ordinary execution processing is performed.

The present invention is directed to a system of loading and dumping data in an information processor comprising a program control portion, a paired data detecting portion and an operation processing portion, an execution packet applied to the program control portion comprising a field of destination information showing the destination of the execution packet, an identifier field for identifying data having the same queue address by the paired data detecting portion, and an address information field for identifying paired data, together with the identifier, by the paired data detecting portion and fetching the next instruction by the program control portion, the identifier field being used as a part of an address for sending data and a number for identifying the information processor contained in the queue address so that a structure of the packet is converted and the packet after conversion is used for loading and dumping data.

Thus, in the system of loading and dumping data according to the present invention, when data is loaded or dumped into or from a program memory, an identifier is not required. Thus, the identifier field is used as a part of an address for sending data and a number identifying an information processor contained in a queue address so that a structure of a packet is converted, whereby it can be easily determined without using the identifier whether data is to be loaded/dumped or ordinary execution processing is to be performed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic block diagram showing an information processor according to one embodiment of the present invention;

FIGS. 2A and 2B are diagrams showing an example in which an ordinary packet is converted into a load/-dump packet;

FIGS. 3A and 3B are diagrams showing a data packet loaded into a program memory;

FIG. 4 is a diagram showing a data packet applied to a program memory so as to dump data therefrom;

FIGS. 5A and 5B are diagrams showing a data packet dumped from the program memory;

FIG. 6 is a diagram showing a data packet applied to a paired data detecting portion;

FIGS. 7A and 7B are diagrams showing a data packet dumped from the paired data detecting portion;

DESCRIPTION OF THE PREFERRED EMBODIMENTS

FIG. 1 is a schematic block diagram showing an information processor according to one embodiment of the present invention, and FIG. 2 is a diagram showing an example in which an ordinary packet is converted into a load/dump packet.

Figure 8:
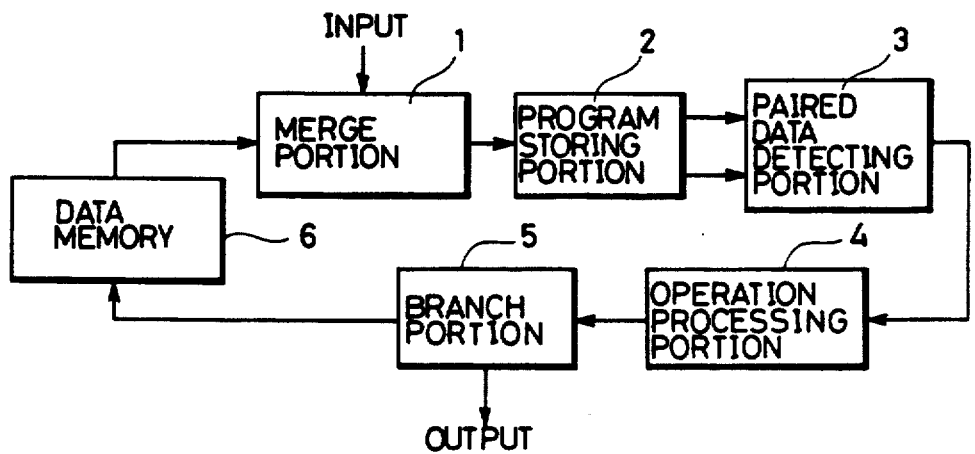
FIG. 8 is a schematic block diagram showing a conventional data flow type information processor.
Figure 9A:
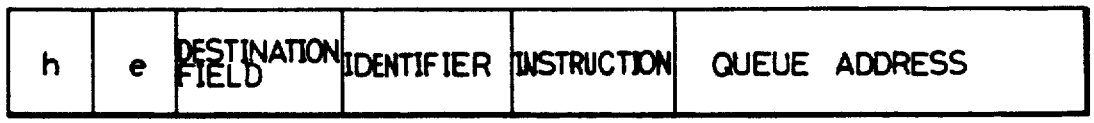
FIGS. 9A and 9B are diagrams showing a structure of a data packet inputted to the data flow type information processor shown in FIG. 8.
Figure 9B:
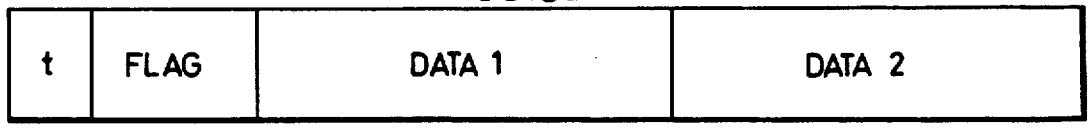
Figure 10:
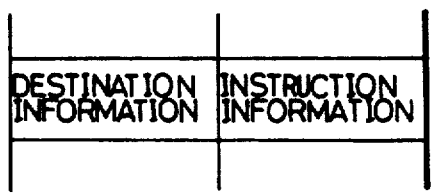
FIG. 10 is a diagram showing one example of program data stored in a program storing portion shown in FIG. 8.

The information processor shown in FIG. 1 is the same as that shown in FIG. 8 except that a converting portion 7 for converting an inputted data packet before being applied to an input side of a merge portion 1. The converting portion 7 converts a structure of the inputted data packet shown in FIG. 2A into a structure of the inputted data packet shown in FIG. 2B when program data is loaded/dumped into/from a program memory 21 included in a program storing portion 2. More specifically, when the program data is loaded/dumped into/-from the program memory 21, a paired data detecting portion 3 is not used, so that an identifier is not required. On the other hand, when a plurality of information processors are coupled to each other, each of the information processors must be identified, so that the information processors must be given a number, i.e., a processor number.

Then, an address for loading/dumping is divided into a high order and a low order. The high order is used as an identifier field, and the low order is in a queue address field. A processor number is contained in the remaining portion in the queue address. On the contrary, a path of dumped data is in the direction from a branch portion 5 to the exterior, and the processor number is the destination to which data is returned, for example, a display unit.

FIGS. 3A to 7B are diagrams showing more specifically a data packet, for explaining more specifically an operation of the information processor according to one embodiment of the present invention, where FIGS. 3A and 3B show a data packet loaded into the program memory 21 FIG. 4 shows a data packet applied to the program memory 21 so as to dump data therefrom FIGS. 5A and 5B show a data packet dumped from the program memory 21 FIG. 6 shows a data packet applied to a paired data detecting portion and FIGS. 7A and 7B show a data packet dumped from the paired data detecting portion.

When program data is loaded or dumped into or from the program memory 21 in the program storing portion 2, "00, 1100" is set as shown in FIG. 3A in order to show that a destination field is the program storing portion 2 "00, 0100" is set when data is loaded or dumped into or from a data memory 6, and "00, 10**" is set when data operated in an operation processing portion 4 is outputted to the exterior. When the converting portion 7 determines that the destination field is "00, 1100", a queue address is divided into a high order and a low order, as shown in FIG. 3. The high order is stored in an identifier field, and the low order is stored in a queue address field. A processor number is stored in the remaining portion in the queue address. As shown in FIG. 3B, loaded data is stored in a tail packet.

When data is dumped from the program memory, data stored in a head packet as shown in FIG. 4 is applied to the program storing portion 2. When data is dumped from the program memory 21, a head packet as shown in FIG. 5A and a tail packet as shown in FIG. 5B are outputted. Meanwhile, if an instruction is NO-OP (no-operation), the dumped data passes through the paired data detecting portion and the operation processing portion without being operated upon (bypasses the paired data detecting portion 3 and the operation processing portion 4), so that the data is outputted to the exterior from the branch portion 5 without any modification.

When data is applied to the paired data detecting portion 3, the destination field is "01, 1101" as shown in FIG. 6, so that a data packet as shown in FIGS. 7A and 7B is dumped from the paired data detecting portion 3. Meanwhile, only a data 1 field is used for the data dumped from the internal program memory, and both data 1 and 2 fields are used for the data dumped from the paired data detecting portion 3. In addition, data is not loaded into the paired data detecting portion 3. The reason is that the content of the paired data detecting portion 3 is generally cleared in the initial state in which a program is executed.

As described in the foregoing, according to one embodiment of the present invention, an identifier field is used as a part of an address for sending data and a number identifying an information processor is contained in a part of a queue address so that a structure of a packet is converted and the packet after conversion is used for loading and dumping data into and from a program memory, whereby it can be determined without providing the identifier whether ordinary execution processing is performed or data is loaded and dumped.

Although the present invention has been described and illustrated in detail it is clearly understood that the same is by way of illustration and example only and is not to be taken by way of limitation, the spirit and scope of the present invention being limited only by the terms of the appended claims.

What is claimed is:

1. A system of loading and dumping data in an information processor which utilizes a reduced number of bits to effectively process data, comprising;

formatting means for formatting bytes of information from exterior of the system into an execution packet, said bytes of information excluding a conventional execution field, thereby reducing a number of bits required to process data effectively, the conventional execution field conveying either a normal state of execution or a data load/dump procedure;

program control means, operatively connected to said formatting means and having a program memory to store a data flow program, for fetching an instruction from said program memory in response to said execution packet and for producing paired program data and data from the fetched instruction and said execution packet;

paired data detecting means, operatively connected to said program control means, for detecting whether said paired program data and data to be processed are inputted from said program control means;

operation processing means, responsive to the detection by said paired data detecting means, for executing an operation based on said paired program data and data to be processed and said fetched instruction;

data memory means for storing data processed by said operation processing means;

merge means, operatively connected to said formatting means and said data memory means, for applying either data from said data memory means or said execution packet from said formatting means to said programs control means; and branch means for dumping to the exterior of the system said data to be processed in response to said operation processing means;

said execution packet including a destination information field showing a destination of said execution packet, an identifier field for enabling said paired data detecting means to identify data having a same queue address, an instruction information field, and an address information field for identifying the paired program data;

said address information field and said identifier field together informing said paired data detecting means of the paired program data and said program control means of a next instruction to fetch;

said identifier field being used as a part of an address for sending data and a number for identifying the information processor, said number being contained in a part of the queue address.

* * * * *